J. E. MEYERS.
SEMAPHORE INSTRUCTOR.
APPLICATION FILED SEPT. 2, 1916.
1,229,638.
Patented June 12, 1917.
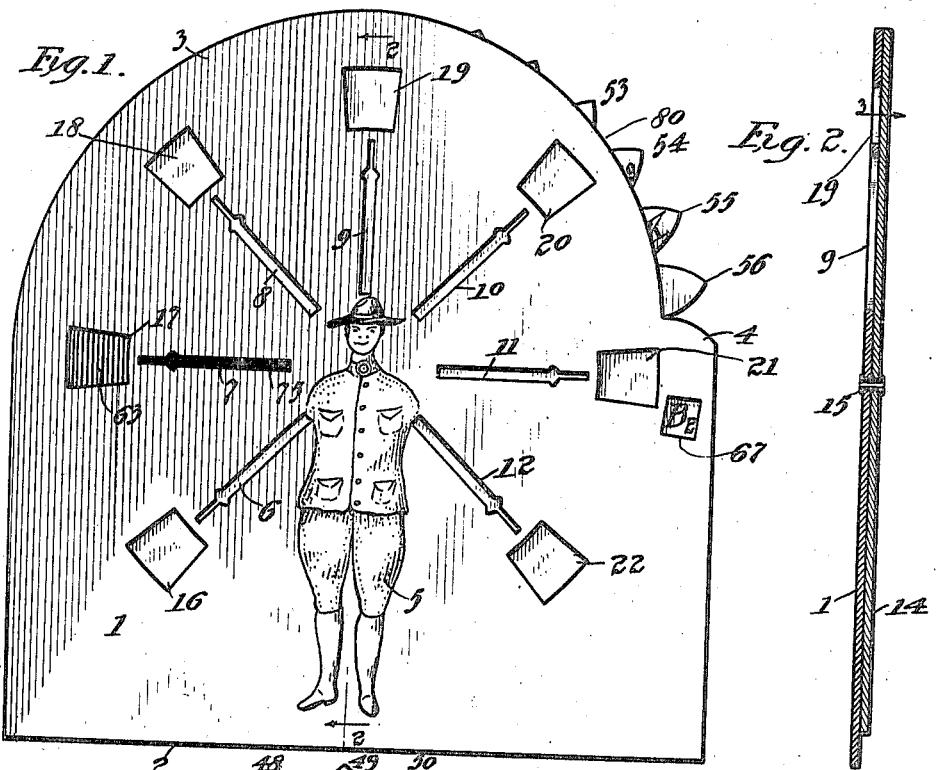
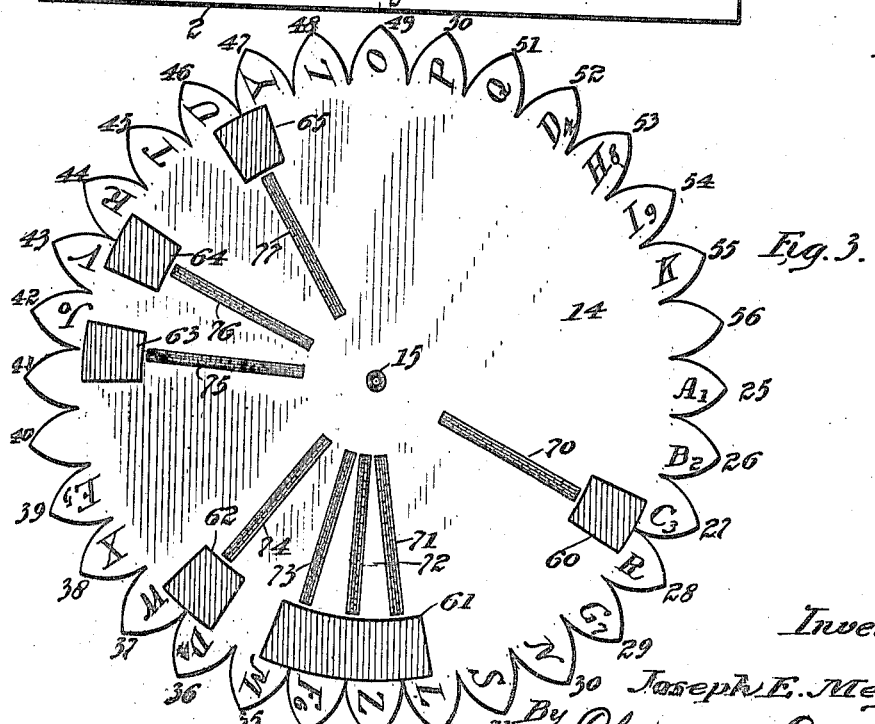
Inventor:
Joseph E. Meyers
By Cheever & Cox
Attys.

UNITED STATES PATENT OFFICE.

JOSEPH E. MEYERS, OF CAMP STOTSENBURG, PAMPONGA, PHILIPPINE ISLANDS.

SEMAPHORE-INSTRUCTOR.

1,229,638.  Specification of Letters Patent.  Patented June 12, 1917.

Application filed September 2, 1916. Serial No. 118,215.

*To all whom it may concern:*

Be it known that I, JOSEPH E. MEYERS, a citizen of the United States, residing at Camp Stotsenburg, in Pamponga, Philippine Islands, have invented a certain new and useful Improvement in Semaphore-Instructors, of which the following is a specification.

My invention resides in a device for aiding to teach and learn the semaphore letters and numerals used, for example, in the United States Army and Navy and by the Boy Scouts and others in short distance signaling. It is well known that these signals are formed by holding a flag or flags in various positions corresponding to the letters of the alphabet or to the Arabic numerals.

The object of my invention is to provide a device which will exhibit the various positions and combinations of positions of the flags by rotating a disk to the proper position. Contributory to this general object it is my purpose to embody the invention in a convenient and simple form. Also to provide means whereby the disk may be readily rotated and may be readily arrested in the proper position. Other contributory objects will become apparent as the description proceeds.

I accomplish my objects by the mechanism illustrated in the accompanying drawings in which—

Figure 1 is a front view of the complete device.

Fig. 2 is a vertical section on the line 2—2, Fig. 1.

Fig. 3 is a face view of the rotatable disk.

Similar numerals refer to similar parts throughout the several views.

A screen 1 forms the front of the device, and while its outline may be varied, I prefer to construct it in the manner shown, with a straight base line 2, a circular upper edge 3, and a shoulder 4 at the right side about midway between the top and the bottom. A human figure, 5, representing the sender, is painted or otherwise portrayed about midway between the lateral edges of the screen and ordinarily this will represent the standing figure of a man in military or naval costume. The figure is not provided with arms, but radiating from a point at or near the shoulder are seven slots, 6, 7, 8, 9, 10, 11 and 12, through which may be seen the disk 14. This disk is rotatably mounted upon the back of the screen and in the preferred construction is supported upon an eyelet, 15, located at the point in the screen from which the slots radiate. The positions of the slots on the screen correspond to the seven different positions in which the flags are held in signaling.

At the outer end of each of the slots 6—12 is an approximately square aperture, these being indicated by the reference numerals, 16—22, inclusive. The slots may be regarded as arm openings, and the apertures as flag openings, the latter being of a size approximately corresponding to the size of a signal flag when drawn upon the same scale as the human figure at the center of the screen. The flag apertures are arranged in a circle concentric with the eyelet and correspond to the seven standard flag positions. One is vertically above the head of the sender, two are arranged at the sides on a level with his shoulders, and one pair are arranged at 45 degrees above horizontal and the other at 45 degrees below.

Teeth or projections are formed at the periphery of the disk, 14, where they may be engaged by the forefinger of the user. The letters of the alphabet and the numerals, 0 to 9 are marked on the disk in the form of a circle concentric with the eyelet. In the present form they are marked upon the teeth themselves. In the form shown in the drawings there are thirty-two of these teeth and they are marked and arranged as follows in the sequence named, proceeding in a clockwise direction:

On tooth 25 are marked the letter A and the numeral 1.

On tooth 26 are marked B and 2.
On tooth 27 are marked C and 3.
On tooth 28 is R.
On tooth 29 are G and 7.
On tooth 30 is N.
On tooth 31 is S.
On tooth 32 is L.
On tooth 33 is Z.
On tooth 34 are F and 6.
On tooth 35 is M.
On tooth 36 are D and 4.
On tooth 37 is W.
On tooth 38 is X.
On tooth 39 are E and 5.
Tooth 40 is blank.
Tooth 41 is blank.
On tooth 42 are J and 0.

On tooth 43 is V.
On tooth 44 is R.
On tooth 45 is T.
On tooth 46 is U.
On tooth 47 is Y.
On tooth 48 is L.
On tooth 49 is O.
On tooth 50 is P.
On tooth 51 is Q.
On tooth 52 are D and 4.
On tooth 53 are H and 8.
On tooth 54 are I and 9.
On tooth 55 is K.
Tooth 56 is blank.

Thus, there are 32 teeth in the arrangement shown and three of these are blank. Also the letters R and D are duplicated at points diametrically opposite to each other respectively.

On this disk are marked six sectors, 60, 61, 62, 63, 64 and 65. With the exception of the color sector, 61, all of the sectors are of substantially the same width as the flag openings, and by preference the teeth extend through the same arc. Sector 61 is of triple width as shown. With the exception of sector 60, all of the sectors are located on one-half of the disk.

The screen has a sight aperture, 67, in it through which will be exhibited the letters of the code one at a time. The position of the color sectors relatively to the letters on the disk will depend upon the position of the sight aperture relatively to shoulder 4 on the screen, from which it follows that the position of the sectors relatively to the letters will vary according to the position of the sight apertures.

It has been found that the present arrangement of the color sectors not only exhibits the letters accurately, but makes it possible to employ full sized flag apertures. Of course, the positions of the flag apertures are fixed by the requirements of the code, and their size is more or less fixed if they are to be in proper proportion to the human figure appearing upon the screen.

In order to make the simulation more real, it is desirable to place radiating color strips 70, 71, 72, 73, 74, 75, 76 and 77 on the screen in line with each of the color sectors. The color of these radiating strips is preferably the same as the clothing of the human figure. Thus, when a color sector appears at any flag aperture, it will appear as if the figure were holding his arm in position to support the signal flag at this point.

In operation, when the user wishes to learn what the signal is corresponding to any given letter, he will rotate the disk until that letter appears through the sight aperture, 67. When the required letter appears through this sight aperture, one or two of the color disks, as the case may be, appear at the proper flag apertures in the screen. The upper right quadrant, 80, of the screen is cut away and permits the teeth to project so that they may be engaged by the forefinger of the user. The device is easy to manipulate and little care is required to bring the disk accurately to one of the exhibiting stations, for the parts are so located, that when the index finger of the user strikes shoulder 4, one of the letters will be accurately positioned in front of the sight aperture, 67. Furthermore, rapid rotation of the disk will not cause overthrow, because the succeeding tooth will engage the top of the finger when the latter rests against the shoulder 4; in other words, in using the device, the user inserts his index finger between two adjacent teeth and rotates the disk until his finger engages the shoulder, 4, whereupon the disk will be accurately positioned.

It will be noted that in this device the screen covers all of the teeth except those in the upper right quadrant. This protects the teeth from damage in case the device is made out of card-board or similar material. It also prevents the teeth from catching any external objects.

It will also be noted that the letters do not occur on the teeth in the same sequence in which they do in the alphabet. This is of advantage to the student because he does not then rely on the sequence of the signals to identify them. Hence, the device may be used as a quizzing device, especially if the user keeps his thumb over the sight aperture, 67, until after he has made his interpretation of the signal. In the present form the sight aperture is located a short distance below the shoulder 4 and hence is in a convenient position to be covered by the thumb when the index finger or forefinger of the user is in position to engage the teeth.

Having thus described my invention, what I claim as new, and desire to secure by Letters Patent, is:—

1. A semaphore instructor having a screen in which are flag openings located in the different flag positions, a rotating disk behind said screen, said disk having the letters of the alphabet marked thereon, and color sectors marked upon said disk in position to be exhibited behind the proper flag opening or openings when the disk is brought to a position corresponding to the letter intended to be represented.

2. A semaphore instructor having a screen provided with flag openings located in the different flag positions, and having a sight aperture and a rotating disk behind said screen, said disk having the letters of the alphabet marked thereon in a circle, whereby the rotating of the disk will bring different letters to view through the sight aperture, and color sectors marked upon said disk in position to be exhibited behind the proper flag opening or openings when a given letter appears through the sight aperture.

3. A semaphore instructor having a screen provided with seven flag openings located in the standard flag positions around a common center, said screen being also provided with a sight aperture; a disk mounted upon said screen and rotatable upon an axis coincident with said center, said disk having spur teeth and having letters arranged in a circle concentric with the axis of rotation, whereby the rotation of the disk will bring the letters opposite to the sight aperture in the screen, said disk having color sectors marked thereon in position to be exhibited through said flag openings, and a shoulder formed on the screen for arresting the user's finger when the latter is in engagement with a tooth on the disk.

4. A semaphore instructor having the figure of a sender portrayed on the front of a screen and having seven flag openings arranged in a circle centered near the shoulders of the sender, a disk mounted on the back of the screen, said disk having color sectors marked thereon, and said disk being rotatable about an axis concentric with the center of the circle upon which the flag openings are arranged, said disk having spur teeth by which the disk may be rotated, said teeth having the letters of the alphabet marked thereon, and said screen covering the disk and its teeth except at the upper right portion of the screen when the screen is held in normal position looking at the sender, said screen being cut away at said upper right portion for permitting the teeth to project.

5. A semaphore instructor having a screen in which are seven flag openings located in the standard flag positions, and a rotating disk mounted behind said screen, said disk having the letters of the alphabet marked thereon, and also having color sectors marked thereon for showing through said flag openings, said sectors being six in number.

6. A semaphore instructor having a screen in which are seven flag openings of equal width, a rotatable disk mounted on the back of the screen and having the letters of the alphabet marked thereon, and also having color sectors marked upon it for showing through said flag openings, said color sectors being six in number and all of them, except one, being of a width approximately equal to the width of the flag openings.

7. A semaphore instructor having the figure of a sender portrayed on the front of a screen and having seven flag openings arranged in a circle centered near the shoulders of the sender, and said screen also having radial slots in line with said flag openings, a disk rotatably mounted on the back of the screen and having color sectors for showing through said flag openings, said disk also having radial color strips marked thereon in line with said color sectors for showing through said slots, and said disk having the letters of the alphabet marked thereon for identifying the signal indicated by the color sectors appearing through said flag openings.

8. A semaphore instructor consisting of a screen having the figure of a sender portrayed thereon, and having flag openings arranged around the sender in standard positions, a disk rotatably mounted on the back of the screen, color sectors marked on said disk, letters marked on said disk, teeth on said disk adapted to be engaged by the forefinger of the right hand of the user, and a shoulder on the screen for arresting the finger of the user, the screen having a sight aperture in position to exhibit the letters one at a time, said sight aperture being a short distance below the shoulder, whereby it may be conveniently covered by the thumb of the user when his hand is in position to manipulate the teeth with his forefinger.

In witness whereof, I have hereunto subscribed my name.

JOSEPH E. MEYERS.